US008196754B2

(12) United States Patent
Ho (10) Patent No.: US 8,196,754 B2
(45) Date of Patent: Jun. 12, 2012

(54) WATER PERMEABLE MEMBRANES AND METHODS OF MAKING WATER PERMEABLE MEMBRANES (75) Inventor: W. S. Winston Ho, Columbus, OH (US)

(73) Assignee: The Ohio States University Research Foundation, Columbus, OH (US)

( * ) Notice: Subject to any disclaimer, the term of this patent is extended or adjusted under 35 U.S.C. 154(b) by 465 days.

(21) Appl. No.: 12/174,951

(22) Filed: Jul. 17, 2008

(65) Prior Publication Data

US 2008/0296225 A1    Dec. 4, 2008

Related U.S. Application Data

(63) Continuation-in-part of application No. PCT/US2007/060641, filed on Jan. 17, 2007.

(51) Int. Cl.
B01D 29/00 (2006.01)
B01D 29/46 (2006.01)
B01D 61/00 (2006.01)
C02F 1/44 (2006.01)
B29C 44/04 (2006.01)
C08J 9/26 (2006.01)

(52) U.S. Cl. ............. 210/490; 210/500.28; 210/500.33; 210/640; 210/653; 210/654; 210/483; 210/488; 264/48; 264/49

(58) Field of Classification Search .................. None
See application file for complete search history.

(56) References Cited

U.S. PATENT DOCUMENTS

| 4,277,344 A | 7/1981 | Cadotte |
| 4,695,383 A * | 9/1987 | Konagaya et al. ....... 210/500.37 |
| 4,872,984 A | 10/1989 | Tomaschke |
| 4,948,507 A | 8/1990 | Tomaschke |
| 5,087,367 A | 2/1992 | Tsuyumoto et al. |
| 5,246,587 A | 9/1993 | Tomaschke |
| 5,254,261 A | 10/1993 | Tomaschke et al. |
| 5,658,460 A | 8/1997 | Cadotte et al. |
| 5,693,227 A * | 12/1997 | Costa ........................... 210/490 |

(Continued)

FOREIGN PATENT DOCUMENTS

WO    2007/084921    7/2007

OTHER PUBLICATIONS

Membrane Handbook, W.S.W. Ho and K.K. Kirkar, eds., pp. 265-268, Chapman & Hall, New York, 1992.

(Continued)

*Primary Examiner* — Krishnan S Menon
*Assistant Examiner* — Dirk Bass
(74) *Attorney, Agent, or Firm* — Calfee, Halter & Griswold LLP (57) ABSTRACT

Water permeable membranes and methods of forming water permeable membranes are provided. The water permeable membranes are comprised of a cross-linked polyamide containing at least one bifunctional additive that is hydrophilic and reactive. Additionally, in accordance with other embodiments of this invention, methods of forming water permeable membranes comprised of a cross-linked polyamide containing at least one bifunctional additive that is hydrophilic and reactive are provided. Specifically, the water permeable membranes may comprise a membrane formed from a cross-linked aromatic or aromatic/aliphatic polyamide interfacially polymerized on a porous support. The presence of the at least one hydrophilic and reactive additive improves the flux and salt retention properties of the membrane in comparison to a membrane formed without the at least one hydrophilic and reactive additive.

25 Claims, 1 Drawing Sheet

U.S. PATENT DOCUMENTS

| | | | |
|---|---|---|---|
| 5,922,203 | A | 7/1999 | Tomaschke |
| 6,015,495 | A | 1/2000 | Koo et al. |
| 6,063,278 | A | 5/2000 | Koo et al. |
| 6,245,234 | B1 | 6/2001 | Koo et al. |
| 6,368,507 | B1 | 4/2002 | Koo et al. |
| 6,464,873 | B1 | 10/2002 | Tomaschke |
| 2003/0121844 | A1* | 7/2003 | Koo et al. .................. 210/490 |
| 2007/0175820 | A1* | 8/2007 | Koo et al. .................. 210/500.38 |

OTHER PUBLICATIONS

Office of Naval Research (ONR) 2005 Report, Development of High-Flux Water Desalination Membrane, W.S. Winston Ho, The Ohio State University, Contract No. N00014-05-1-00800, submitted Jul. 15, 2005.

Office of Naval Research (ONR) 2006 Report, Development of High-Flux Water Desalination Membrane, W.S. Winston Ho, The Ohio State University, Contract No. N00014-05-1-00800, submitted Jul. 12, 2006.

Office of Naval Research (ONR) 2007 Report, Development of High-Flux Water Desalination Membrane, W.S. Winston Ho, The Ohio State University, Contract No. N00014-05-1-00800, submitted Jul. 11, 2007.

Office of Naval Research (ONR) 2008 Report, Development of High-Flux Water Desalination Membrane, W.S. Winston Ho, The Ohio State University, Contract No. N00014-05-1-00800, submitted Jul. 27, 2008.

International Search Report and Written Opinion from PCT/US07/60641, mailed Sep. 26, 2007.

The Dow Chemical Company, Tech Manual Exceprt, Form 609-02004-504, 2 pgs. Filmtec Membranes, May 2004.

Peterson, "Composite Reverse Osmosis and Nanofiltration Membranes", J Membr Sci, 83, 81 (1993).

Prakash et al., "Interfacially Synthesized Thin Film Composite RO Membranes for Seawater Desalination", J Membr Sci, 124, 263 1997.

* cited by examiner

WATER PERMEABLE MEMBRANES AND METHODS OF MAKING WATER PERMEABLE MEMBRANES

CROSS-REFERENCE TO RELATED APPLICATION

This application claims priority to and any other benefit of U.S. Provisional Application No. 60/759,599, filed Jan. 17, 2006, entitled HIGH FLUX REVERSE OSMOSIS MEMBRANE, which is expressly incorporated by reference herein; and also claims priority to and any other benefit of International Patent Application No PCT/US2007/060641, filed Jan. 17, 2007, entitled WATER PERMEABLE MEMBRANES AND METHODS OF MAKING WATER PERMEABLE MEMBRANES, which is expressly incorporated by reference herein.

STATEMENT REGARDING FEDERALLY FUNDED RESEARCH

This invention was made with Government support under grant no. N00014-03-10994 awarded by the Office of Naval Research. The Government has certain rights in the invention.

BACKGROUND

Water permeable membranes may be used in a number of applications to provide desired separation of components. For example, dissolved substances such as salts can be separated from their solvents, e.g. water, by a procedure known as reverse osmosis. Reverse osmosis is an effective and versatile technology for water desalination. This technology can produce potable water from brackish and sea waters as well as surface, lake, and river waters in a one-step process after feed pretreatment. Thus, large volumes of usable water for industrial, agricultural, and home use can be produced from previously unusable water sources. In another example, water permeable membranes may be useful in dialysis and pervaporation.

Some water permeable membranes may be formed from a cross-linked aromatic polyamide interfacially polymerized on a porous support. See, U.S. Pat. No. 4,277,344, the disclosure of which is incorporated herein by reference. See also, U.S. Pat. Nos. 5,254,261, 5,246,587, 6,015,495, 6,063,278, and 6,245,234, the disclosures of which are also incorporated herein by reference. Although these water permeable membranes may have good performance including high salt rejection and good water flux, increased water flux, high salt rejection, or both is desirable.

SUMMARY

In accordance with embodiments of this invention, water permeable membranes having at least one bifunctional additive that is hydrophilic and reactive are provided. Additionally, in accordance with other embodiments of this invention, methods of forming water permeable membranes having at least one hydrophilic and reactive additive are provided. The water permeable membranes may comprise a membrane formed from a cross-linked aromatic or aromatic/aliphatic polyamide interfacially polymerized on a porous support.

An aspect of the present invention provided herein is a water permeable membrane comprising a membrane formed from a cross-linked aromatic or aromatic/aliphatic polyamide interfacially polymerized on a porous support, wherein the membrane comprises at least one hydrophilic and reactive additive selected from:

the salts thereof, and combinations of these; wherein R is a $C_1$-$C_9$ saturated or unsaturated, substituted or unsubstituted, straight or branched alcohol or a $C_1$-$C_9$ saturated or unsaturated, substituted or unsubstituted, straight or branched amine.

Another aspect of the present invention provided herein is a water permeable membrane comprising a membrane formed from a cross-linked aromatic or aromatic/aliphatic polyamide interfacially polymerized on a porous support, wherein the membrane further comprises a hydrophilic and reactive additive selected from:

and combinations of these; wherein: R is a $C_1$-$C_9$ saturated or unsaturated, substituted or unsubstituted, straight or branched alkyl; and R' is nothing or a $C_1$-$C_9$ saturated or unsaturated, substituted or unsubstituted, straight or branched alkyl Another aspect of the present invention provided herein is a water permeable membrane comprising a membrane formed from a cross linked aromatic or aromatic/aliphatic polyamide interfacially polymerized on a porous support, wherein the membrane further comprises at least one hydrophilic and reactive additive, wherein the at least one hydrophilic and reactive additive is present in an amount sufficient so that the membrane exhibits a salt rejection capability of at least about 98% when tested with a 2000 ppm NaCl solution at 225 psi and a flux rate of at least about 34 gfd.

Another aspect of the present invention provided herein is a water permeable membrane comprising: (a) a cross-linked polyamide containing one or more pendent reactive groups selected from the group consisting of amines, acyl halides, and mixtures thereof residing on the surface of a porous substrate, wherein the cross-linked polyamide is formed by interfacially polymerizing a multifunctional amine with a multifunctional acyl halide to an extent such that sufficient amine groups, acyl halide groups, or both remain unreacted to thereby comprise the one or more pendent reactive groups;

and (b) an additive having a hydrophilic portion and a reactive portion, wherein the additive is bound to the cross-linked polyamide by chemical attachment of the reactive portion of the additive to the one or more pendent reactive groups, and; wherein the membrane exhibits improved water flux and improved salt retention properties compared to an otherwise identical membrane that does not contain any additive.

Another aspect of the present invention provided herein is a method for forming a water permeable membrane, comprising: applying a solution of at least one aromatic or aromatic/aliphatic polyamine to a porous support; and applying a polyfunctional acyl halide solution to a porous support such that a water permeable membrane is formed, wherein at least one hydrophilic and reactive additive is present in at least one of the solution of aromatic or aromatic/aliphatic polyamine and the polyfunctional acyl halide solution, and wherein the at least one hydrophilic and reactive additive is selected from:

and the salts of the hydrophilic and reactive additives; wherein R is a $C_1$-$C_9$ saturated or unsaturated, substituted or unsubstituted, straight or branched alcohol or a $C_1$-$C_9$ saturated or unsaturated, substituted or unsubstituted, straight or branched amine.

Another aspect of the present invention provided herein is a method for forming a water permeable membrane, comprising: applying a solution of at least one aromatic or aromatic/aliphatic polyamine to a porous support; and applying a polyfunctional acyl halide solution to a porous support such that a water permeable membrane is formed, wherein at least one hydrophilic and reactive additive is present in at least one of the solution of aromatic or aromatic/aliphatic polyamine and the polyfunctional acyl halide solution, and wherein the at least one hydrophilic and reactive additive is selected from:

and combinations, wherein: R is a $C_1$-$C_9$ saturated or unsaturated, substituted or unsubstituted, straight or branched alkyl; and R' is nothing or a $C_1$-$C_9$ saturated or unsaturated, substituted or unsubstituted, straight or branched alkyl.

BRIEF DESCRIPTION OF THE DRAWINGS

The following detailed description of embodiments of the present invention can be best understood when read in conjunction with the following drawings, where like structure is indicated with like reference numerals.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of this invention, water permeable membranes having at least one bifunctional additive that is hydrophilic and reactive additive are provided. Additionally in accordance with other embodiments of this invention, methods of forming water permeable membranes having at least one hydrophilic and reactive additive are provided. The water permeable membranes may comprise a membrane formed from a cross-linked aromatic or aromatic/aliphatic polyamide interfacially polymerized on a porous support. In some examples, the membranes exhibit, under at least some conditions, improved salt rejection capability, improved flux rates, or both. The membranes, additives, and methods of forming the membranes are discussed with further specificity below.

Interfacial Polymerization of the Polyamide

In some embodiments, the membranes comprise cross-linked aromatic polyamide membranes. The membranes may be made by interfacially polymerizing at least one polyamide on a porous support. For example, the interfacial polymerization my be performed by contacting a suitable porous support with a solution of a multifunctional aromatic amine or multifunctional aromatic/aliphatic amine in a suitable solvent and then contacting the amine-wetted porous support with a multifunctional acyl halide also in a suitable solvent, whereby the multifunctional amine and the multifunctional acyl halide polymerize interfacially. It will be understood that the term "interfacial polymerization" refers to the polymerization or cross-linking of the multifunctional aromatic amine or multifunctional aromatic/aliphatic amine and the acyl halide on the pore surfaces of the porous support.

In some examples, the polyfunctional amine to be used may be any essentially monomeric amine having at least two amine functional groups, and possibly two to three or more amine functional groups. The particular polyamine employed is not critical, and any suitable polyfunctional amine now or hereafter known to be useful for making membranes based on cross-linked aromatic or aromatic/aliphatic polyamides interfacially polymerized on a porous support can be used for this purpose. Examples include, but are not limited to, m-phenylenediamine, o-phenylenediamine, p-phenylenediamine, piperazine, 1,3,5-triaminobenzene, 4,4'-oxydianiline, 3,4'-oxydianiline, 4,4'-methylene dianiline, 4,4'-methylene di-o-chloroaniline, polyethylenimine, and polyallylamine. Mixtures of polyfunctional amines can also be used.

In some examples, when contacted with the porous support, the polyfunctional amine will be dissolved in a suitable solvent. Examples of suitable solvents include, but are not limited to, water, isopropyl alcohol, ethanol, methanol, butanol, pentanol, hexanol, heptanol, octanol, nonanol, decanol, undecanol, and decanol, and mixtures thereof. It will be understood that any suitable concentration of polyfunctional amine may be used. For example, the concentration of the polyfunctional amine in solution may be about 0.1 to 10.0 percent by weight, about 1.0 to 8.0 percent by weight, or about 1.5 to 2.5 percent by weight.

In some examples, any suitable polyfunctional acyl halides can be used to form the membranes of the present invention. These compounds may be essentially monomeric, aromatic or aromatic/aliphatic amine-reactive polyfunctional acyl halides, having at least two, and possibly, two to three, or more acyl halide groups per molecule. In some examples, chlorides may be particularly desirable due to lower cost and greater availability in comparison to the corresponding bromides or iodides. Examples of suitable acyl halides include, but are not limited to, trimesoyl chloride, isophthaloyl chloride, terephthaloyl chloride, cyclohexane-1,3,5-tricarbonyl chloride, 1-isocyanato-3,5-benzenedicarbonyl chloride (5-isocyanato-isophthaloyl chloride), and adamantane-2,6-dione, 1,3,5,7-tetracarbonyl chloride.

In some instances, when contacted with the porous support, the acyl halide may be dissolved in a suitable organic solvent in accordance with known technology. For example, non-polar organic solvents which are capable of dissolving the polyfunctional acyl halide being used and which are also immiscible with water may be used. Examples of suitable solvents include, but are not limited to, cyclohexane, heptane, and alkanes having from 1 to 12 carbon atoms. In some examples, ISOPAR G®, which is a mixture of alkanes having about 8 to 12 carbon atoms, may be used. It will be understood that any suitable concentration of acyl halide may be used. For example, the acyl halide may be present in solution in an amount of about 0.005 to 5.0 percent by weight, about 0.01 to 0.5 percent by weight, or about 0.05 to 0.1 percent by weight. U.S. Pat. No. 4,277,344 contains examples of suitable systems and methods that may be employed in forming suitable membranes.

It will be understood that any suitable technique may be used to form a membrane comprising an aromatic or aromatic/aliphatic polyamide interfacially polymerized on a porous support. For example, rather than applying the multifunctional aromatic amine first and thereafter applying the multifunctional acyl halide second, these steps can be reversed by contacting the porous support with a solution of the multifunctional acyl halide first and then contacting the acyl halide-wetted porous support with the multifunctional aromatic amine second.

In other examples, other polyamide producing chemical reactions can be used in place of the amine/acyl halide reaction described above. For example, dicarboxylic acids and diamines could be condensation polymerized on the porous support by contacting the porous support with a solution of a dicarboxylic acid in a suitable solvent and then contacting the dicarboxylic acid-wetted porous support with a diamine also in a suitable solvent. Alternatively, the porous support can be contacted with the diamine first followed by the dicarboxylic acid second. Also, instead of using an aromatic dicarboxylic acid, an aromatic diamine can be used for introducing the aromatic groups. Thus, it will be understood that any suitable technique which is now or hereafter known to produce a membrane comprising an aromatic or aromatic/aliphatic polyamide interfacially polymerized on a porous support can be used to provide the form the membrane of the present invention.

Porous Support

Any suitable porous support may be used to form the water permeable membranes of the present invention. For example, the porous support may be formed from a synthetic polymerized material such as polysulfone, polyarylether sulfone, polyimide, polystyrene, or various halogenated polymers such as polyvinylidene fluoride. In some examples, the porous support comprises polysulfone.

It will be understood that a porous support having any suitable pore size may be used. For example, the pores may be sufficiently small enough to allow bridging-over the pores during polymerization, but not so small as to hinder passage of permeate. In other examples, the pores may have diameters in the micrometer or nanometer range. For example, the pores may have diameters of about 1 to 1000 nanometers, about 10 to 100 nanometers, or about 20 to 80 nanometers.

Hydrophilic and Reactive Additives

In accordance with embodiments of this invention, it has been found that the water flux capacity, salt rejection capabilities, or both of water permeable membranes formed in accordance with the methods of the present invention may be enhanced by the addition of at least one hydrophilic and reactive additive to the polyamide. Thus, in accordance with embodiments of the present invention, water permeable membranes comprising a membrane formed from a cross-linked aromatic or aromatic/aliphatic polyamide interfacially polymerized on a porous support and further having at least one hydrophilic and reactive additive are provided.

The hydrophilic and reactive additive is selected to have a reactive portion that reacts with at least one of the components that reacts to form the polyamide. For example, the reactive portion may be selected to react with one or both of the polyfunctional amine and the polyfunctional acyl halide during the interfacial polymerization reaction, when the polyfunctional amine and polyfunctional acyl halide are used. The hydrophilic and reactive additive also has a hydrophilic portion. It is believed that the hydrophilic portion can provide passage for hydrophilic permeates, such as water, through the membrane. Thus, the hydrophilic and reactive additive is an additive having bifunctionality. According to various embodiments, the hydrophilic and reactive additive may provide interruptions in the polyamide chain to facilitate passage of water or other permeates through the membrane.

In at least some embodiments, the hydrophilic and reactive additive may be chemically bonded to the polyamide. In this context, "chemically bonded" means that the hydrophilic additive is not merely physically present in the polyamide.

Rather, "chemically bonded" means that some form of chemical bond such as a covalent bond or an ionic bond is formed between the hydrophilic compound and the polyamide.

The hydrophilic and reactive additive may be incorporated into the membrane in any suitable manner. For example, the polyamide may be formed from a polyfunctional amine and polyfunctional acyl halide, as discussed above, and at least one hydrophilic and reactive additive may be included in the reaction system. The hydrophilic and reactive additive may have a reactive portion that includes a moiety capable of reacting with either (or both) of the polyfunctional amine or the polyfunctional acyl halide during the interfacial polymerization reaction.

For example, one approach is to include in the polyfunctional amine solution a hydrophilic additive containing an acyl halide-reactive moiety so that the hydrophilic and reactive additive reacts with and is chemically bonded to the polyfunctional acyl halide in the subsequently formed polyamide. Another approach is to include in the polyfunctional acyl halide solution a reactive additive that reacts with and is chemically bonded to the polyfunctional amine of the subsequently formed polyamide.

Still another approach for forming the water permeable membranes is to incorporate the hydrophilic and reactive additive or additives into the system after the interfacially formed polyamide is made. The additive or additives may be incorporated in any suitable manner. For example, the hydrophilic and reactive additive may be incorporated by forming the polyamide in such a way that it includes pendant reactive groups and then contacting the polyamide so formed with a hydrophilic and reactive additive capable of reacting with the pendant groups. For example, a polyamide made with an excess of polyfunctional amine such that the product polymer includes pendant amino groups could be subsequently reacted with one a hydrophilic and reactive additive that is amine reactive.

Any suitable reactive portion may be present in the compound. For example, reactive portions may include amino and hydroxyl groups. Any suitable hydrophilic portion may be present in the compound. For example, hydrophilic portions may include compounds that contain, and/or can yield in aqueous solution, one or more of the following hydrophilic groups: a carboxyl group, a $C_1$-$C_8$ alkyl amine salt of a carboxyl group, a sulfonyl group, a $C_1$-$C_8$ alkyl amine salt of a sulfonyl group, a hydroxyl group, a morpholine group, a pyridine group.

In one embodiment, the hydrophilic and reactive additive may have a structure of:

and the salts thereof, wherein R is a $C_1$-$C_9$ saturated or unsaturated, substituted or unsubstituted, straight or branched alcohol or a $C_1$-$C_9$ saturated or unsaturated, substituted or unsubstituted, straight or branched amine. In this example, the morpholine portion of the additive is the hydrophilic portion and the amine or alcohol is the reactive portion. It will be understood that any suitable salt may be used. For example, the salt may be derived from one of the acids, wherein the cation of the salt is selected from lithium, sodium, potassium, Groups IIA, IB, IIB, IIIA, and VIII metals, ammonium, $C_2$-$C_{12}$ alkyl ammonium, quaternary ammonium, and $C_{12}$-$C_{24}$ alkyl quaternary ammonium.

In another embodiment, the hydrophilic and reactive additive may have a structure of:

and the salts thereof, wherein R is a $C_1$-$C_9$ saturated or unsaturated, substituted or unsubstituted, straight or branched alcohol or a $C_1$-$C_9$ saturated or unsaturated, substituted or unsubstituted, straight or branched amine. In this example, the pyridine portion of the additive is the hydrophilic portion and the amine or alcohol is the reactive portion. It will be understood that any suitable salt may be used. For example, the salt may be derived from one of the acids, wherein the cation of the salt is selected from lithium, sodium, potassium, Groups IIA, IB, IIB, IIIA, and VIII metals, ammonium, $C_2$-$C_{12}$ alkyl ammonium, quaternary ammonium, and $C_{12}$-$C_{24}$ alkyl quaternary ammonium.

In yet another embodiment, the hydrophilic and reactive additive may have a structure of:

wherein R is a $C_1$-$C_9$ saturated or unsaturated, substituted or unsubstituted, straight or branched alkyl and R' is nothing or a $C_1$-$C_9$ saturated or unsaturated, substituted or unsubstituted, straight or branched alkyl. Thus, the reactive\ portion may be the hydroxy or amine group and the hydrophilic portion may be the carbonyl or sulfonyl portion.

Specific examples of suitable hydrophilic and reactive additives include, but are not limited to, o-aminobenzoic acid-triethylamine salt (o-aminobenzoic acid-(Et)$_3$N), 4-(2-hydroxyethyl) morpholine, 2-(2-hydroxyethyl) pyridine, m-aminobenzoic acid-triethylamine salt, p-aminobenzoic acid-triethylamine salt, o-aminobenzenesulfonic acid-triethylamine salt, m-aminobenzenesulfonic acid-triethylamine salt, p-aminobenzenesulfonic acid-triethylamine salt, o-aminotoluenesulfonic acid-triethylamine salt, m-aminotoluenesulfonic acid-triethylamine salt, p-aminotoluenesulfonic acid-triethylamine salt, o-hydroxybenzoic acid-triethylamine salt, m-hydroxybenzoic acid-triethylamine salt, and p-hydroxybenzoic acid-triethylamine salt. For example, the hydrophilic and reactive additive may be o-aminobenzoic acid-triethylamine salt, 4-(2-hydroxyethyl) morpholine, or 2-(2-hydroxyethyl) pyridine.

The hydrophilic and reactive additive may be present in any suitable amount. For example, the hydrophilic and reactive additive or additives may be present in an amount sufficient to achieve an increase in the flux capacity, salt rejection capability, or both of a membrane versus the same membrane made in the absence of the hydrophilic and reactive additives.

In some examples, the at least one hydrophilic and reactive additive is present in an amount sufficient so that the membrane exhibits a salt rejection capability of at least about 95% when tested with a 2000 ppm NaCl solution at 225 psi and a flux rate of at least about 25 gfd. In another example, the at least one hydrophilic and reactive additive is present in an amount sufficient so that the membrane exhibits a salt rejection capability of at least about 96% when tested with a 2000 ppm NaCl solution at 225 psi and a flux rate of at least about 30 gfd. In yet other examples, wherein the at least one hydrophilic and reactive additive is present in an amount sufficient so that the membrane exhibits a salt rejection capability of at least about 98% when tested with a 2000 ppm NaCl solution at 225 psi and a flux rate of at least about 34 gfd.

The specific concentration of the at least one hydrophilic and reactive additive may vary significantly depending on the particular polyamide being made and the particular hydrophilic additive being used. In some examples, the concentration of the at least one hydrophilic and reactive additive in the multifunctional amine or multifunctional acyl halide solutions may be between about 0.2 to 20.0 percent by weight, about 1.0 to 10.0 percent by weight, about 2.0 to 4.0 percent by weight, or about 2.80 to 2.90 percent by weight.

In some embodiments, methods of forming water permeable membranes are provided. The methods can comprise applying a solution of at least one aromatic or aromatic/aliphatic polyamine to a porous support and applying a polyfunctional acyl halide solution to a porous support such that a water permeable membrane is formed, wherein at least one hydrophilic and reactive additive is present in at least one of the solution of aromatic or aromatic/aliphatic polyamine and the polyfunctional acyl halide solution.

Additional Treatments and Components

It will be understood that any suitable additional treatments or membrane components may be used. For example, the water permeable membrane may be dried prior to storage and/or shipment. For example, the membrane may be dried at about 60 to 100° C. for about 5 to 20 minutes or at about 85 to 95° C. for about 10 to 15 minutes. See, R. J. Petersen, "Composite Reverse Osmosis and Nanofiltration Membranes," *J. Membr. Sci.*, 83, 81 (1993), for examples of suitable drying conditions.

Drying water permeable membranes above 60° C. may result in a loss of water flux and/or salt rejection capabilities of the membrane. To ameliorate this problem, the membranes can be treated to incorporate a flux-enhancing additive therein by soaking the membrane in a flux-enhancing additive, by introducing the flux-enhancing compound into the membrane during interfacial polymerization, or by a combination of both methods. See U.S. Pat. Nos. 5,658,460, 6,368,507, and 6,464,873, the disclosures of which are incorporated herein by reference.

Any suitable flux-enhancing additives may be used. For example, compounds containing hydroxyl-moieties and combinations of these compounds may be used. For example, compounds containing hydroxyl moieties include, but are not limited to, glycerol, ethylene glycol, diethylene glycol, triethylene glycol, tetraethylene glycol, polyethylene glycol, and polyvinylalcohol may be used.

Organic acid salts, combinations of organic acid salts, and combinations of hydroxyl containing compounds and organic acid salts may also be used as flux-enhancing additives. Specific examples of organic acid salts include, but are not limited to, camphorsulfonic acid-triethylamine salt, camphorsulfonic acid-N,N-dimethyl-3-aminopyridine salt, camphorsulfonic acid-sodium salt, camphorsulfonic acid-potassium salt, toluenesulfonic acid-triethylamine salt, toluenesulfonic acid-N,N-dimethyl-3-aminopyridine salt, toluenesulfonic acid-sodium salt, toluenesulfonic acid-potassium salt, benzenesulfonic acid-triethylamine salt, benzenesulfonic acid-N,N-dimethyl-3-aminopyridine salt, benzenesulfonic acid-sodium salt, benzenesulfonic acid-potassium salt, methanesulfonic acid-triethylamine salt, methanesulfonic acid-N,N-dimethyl-3-aminopyridine salt, and methanesulfonic acid-sodium salt, and methanesulfonic acid-potassium salt.

Flux-enhancing additives may be added by soaking the membranes in an aqueous solution of the additive. It will be understood that the flux-enhancing additive may have any suitable concentration in the solution. If the flux-enhancing additive is a hydroxyl-containing compound, the concentration of the compound in aqueous solution may be about 1.0 to 20.0 percent by weight or about 3.0 to 8.0 percent by weight, for example. If the flux-enhancing additive is an organic acid salt, the concentration of the acid salt in aqueous solution may be about 1.0 to 20.0 percent by weight, about 3.0 to 10.0 percent by weight, or about 5.0 to 8.0 percent by weight, for example. Where the flux-enhancing compound is added during interfacial polymerization, a corresponding amount may be used.

The aqueous solution of flux-enhancing additive may further contain a surfactant for improved results. The particular surfactant employed is not critical. Non-limiting examples include sodium lauryl sulfate, sodium dodecylbenzene sulfonate, or sodium dodecylphenoxybenzene sulfonate. Mixtures of surfactants could also be employed. Any suitable amount of surfactant may be used. For example, the surfactant may be present in solution in an amount of about 0.01 to 0.5 percent by weight or about 0.25 to 0.35 percent by weight.

In some instances, the membrane may be soaked in a neutralization solution before soaking in the aqueous solution of flux-enhancing additive. Any suitable aqueous solutions neutralization solutions having any suitable concentration may be used. For example, aqueous solutions of sodium carbonate and/or sodium sulfate containing, for example, 0.2 percent by weight sodium carbonate and 3.3 percent by weight sodium sulfate, may be used.

In order to further enhance their water flux capacities, water permeable membranes made from interfacially polymerized polyamides can be heat treated by heating the membrane to any suitable temperature for any suitable amount of time. For example, the membranes may be heated at about 50 to 180° C., about 70 to 110° C., or about 80 to 100° C. for about 1 to 60 minutes, about 5 to 30 minutes, or about 12 to 16 minutes. See, R. J. Petersen, "Composite Reverse Osmosis and Nanofiltration Membranes," *J. Membr. Sci.*, 83, 81 (1993), for suitable heat treatment methods and conditions.

Membrane Types and Methods of Use

The water permeable membranes of the present invention may be used in any suitable manner. For example, the water permeable membranes may be reverse osmosis membranes. The water permeable membranes may be dialysis membranes. In other examples, the water permeable membranes may be pervaporation membranes.

In some embodiments, methods for desalinating water are provided. The methods comprise passing the water under pressure through a membrane in accordance with the present invention. In other embodiments, methods for dialysis are provided. The methods comprise contacting a membrane in accordance with the present invention with a solution containing solutes and allowing water to diffuse through the membrane. In yet other embodiments, methods for performing pervaporation are provided. In some embodiments the methods comprise contacting a membrane in accordance with the present invention with a liquid feed solution and allowing pervaporation to occur. In other embodiments the methods comprise contacting a membrane in accordance with the present invention with a feed solution under pressure and allowing pervaporation to occur.

EXAMPLES

The present invention will be better understood by reference to the following examples which are offered by way of illustration not limitation.

In the examples, the membranes synthesized are characterized in a laboratory reverse osmosis membrane unit under brackish water desalination conditions using a 2000 ppm NaCl solution in deionized water at 225 psi. The membrane unit is a closed-loop test system consisting of a polypropylene tank of about 5 gal for water supply, a cartridge filter, a constant temperature bath, a high-pressure (up to 1000 psi) positive-displacement pump, a surge tank, a pressure gauge, a membrane cell, a pressure control needle valve, and a rotameter. For each membrane sample, both the water flux and salt rejection were obtained. The water flux was determined by weighing the permeate sample collected for a period of time. The salt rejection is determined from the measurements of the salinities of the permeate and feed samples using a conductivity/salinity meter, i.e.:

Salt Rejection=(Feed Salinity−Permeate Salinity)/ Feed Salinity

The membranes synthesized can also be characterized in the laboratory reverse osmosis membrane unit under seawater conditions using a 3.28% NaCl solution in deionized water at 800 psi.

Example 1

Synthesis of the Membrane Using 2.85% o-Aminobenzoic Acid-Triethylamine Salt in Amine Solution A microporous polysulfone support with a surface pore size of about 50 nm was soaked in isopropyl alcohol (IPA) for 2 hours. The support was then rinsed in deionized water 3 times for 10 minutes per rinse. The back side of the support was dried with a Kimwipe® paper and then taped on a glass plate. The support on a glass plate was put back to deionized water for about 10 seconds. After king the support out of the deionized water, the excess water on the top surface of the support was removed.

The top surface of the support was then dipped in an amine solution containing 1.9 wt % m-phenylenediamine (amine), 2.85 wt % o-aminobenzoic acid-triethylamine (hydrophilic additive), 5 wt % camphorsulfonic acid-triethylamine (flux-enhancing additive), and 0.2 wt % sodium lauryl sulfate (surfactant) in IPA, for 10 seconds.

The support was then removed from the amine solution, and the excess amine solution on the top surface of the support was removed using a squeegee roller. The top surface of the support was then dried in air for about 3.5 minutes.

The top surface of the support was then contacted with an acyl halide solution containing 0.08 wt % of trimesoyl chloride (acyl halide) in Isopar G® for 7 seconds to generate a membrane via interfacial polymerization. The resulting membrane was drained and dried at 80° C. for 4 minutes for hydrocarbon removal. Finally, the membrane was soaked in deionized water before testing for desalination capabilities.

Using the laboratory reverse osmosis membrane unit under brackish water desalination conditions, utilizing a feed solution containing 2000 ppm NaCl in deionized water at 225 psi and 25° C., the membrane of Example 1 showed a water flux of 36.7 gal/ft$^{2}$/day (gfd) and a salt rejection of 98.2%.

Comparative Example A

Synthesis of the Membrane without the Hydrophilic Additive o-Aminobenzoic Acid-Triethylamine Salt in Amine Solution In this comparative example, the membrane synthesis procedure described in Example 1 was followed except that o-aminobenzoic acid-triethylamine (hydrophilic additive) was omitted from the amine solution. The membrane produced exhibited a water flux of 21.6 gfd and a salt rejection of 97.7%.

Comparative Example B

Synthesis of the Membrane without the Hydrophilic Additive o-Aminobenzoic Acid-Triethylamine Salt in Aqueous Amine Solution Comparative Example A was repeated except that water instead of IPA was used as the solvent for the amine solution. The membrane produced exhibited a water flux of 20.8 gfd and a salt rejection of 98.6%.

Examples 2-6

Synthesis of Membranes Using Various o-Aminobenzoic Acid-Triethylamine Salt Concentrations in Amine Solutions Example 1 was repeated except that the concentration of the hydrophilic and reactive additive in the amine solution was varied. The following results were obtained.

TABLE 1

Effect of o-aminobenzoic acid-triethylamine concentration in amine solution on water flux and salt rejection.

| Example Number | o-Aminobenzoic Acid-Triethylamine Concentration (wt %) | Water Flux (gfd) | Salt Rejection (%) |
|---|---|---|---|
| Comparative A | 0 | 21.6 | 97.7 |
| 2 | 1.9 | 27.5 | 97.8 |
| 3 | 2.375 | 33.0 | 98.5 |
| 1 | 2.85 | 36.7 | 98.2 |
| 4 | 3.3 | 32.2 | 98.0 |
| 5 | 4.8 | 33.2 | 97.5 |
| 6 | 5.5 | 32.1 | 97.2 |

Examples 7-9

Glycerol and Heat Treatment with Various Glycerol Concentrations

Three membranes produced according to Example 1 were soaked in a neutralization solution containing 0.2 wt % sodium carbonate and 3.3 wt % sodium sulfate for 20 seconds, and then rinsed in about 47° C. deionized water 4 times for 4 minutes per rinse. After draining, each membrane was soaked in aqueous treating solutions containing different amounts of glycerol (flux-enhancing additive) and 0.3 percent by weight sodium lauryl sulfate (surfactant) in deionized water for 2 minutes. After draining, the each membrane was heat treated at 90° C. for 10 minutes. The following results were obtained.

TABLE 2

Effect of glycerol concentration on water flux and salt rejection.

| Example Number | Glycerol Concentration (wt %) | Water Flux (gfd) | Salt Rejection (%) |
|---|---|---|---|
| 1 | NA | 36.7 | 98.2 |
| 7 | 1 | 33.3 | 97.8 |
| 8 | 5 | 40.8 | 99.0 |
| 9 | 10 | 40.0 | 98.3 |

Examples 10 and 11

Glycerol and Heat Treatment with Various Heat Treatment Times

Example 8 was repeated twice, except that different heat treatment times were used. The following results were obtained.

TABLE 3

Effect of heat treatment time on water flux and salt rejection.

| Example Number | Heat Treatment Time (min) | Water Flux (gfd) | Salt Rejection (%) |
|---|---|---|---|
| 1 | NA | 36.7 | 98.2 |
| 10 | 6 | 37.8 | 97.8 |
| 8 | 10 | 40.8 | 99.0 |
| 11 | 15 | 37.7 | 98.4 |

Examples 12-14

Glycerol/Camphorsulfonic Acid-Triethylamine and Heat Treatment with Various Glycerol Concentrations Example 8 was repeated except that the membrane was soaked in an aqueous treating solution containing 6 wt % camphorsulfonic acid-triethylamine (flux-enhancing additive), 0.3 wt % sodium lauryl sulfate (surfactant), and different amounts of glycerol (flux-enhancing additive) in deionized water for 2 minutes. The following results were obtained.

TABLE 4

Effect of glycerol concentration on water flux and salt rejection when camphorsulfonic acid-triethylamine is also present in the treatment solution.

| Example Number | Glycerol Concentration (wt %) | Water Flux (gfd) | Salt Rejection (%) |
|---|---|---|---|
| 1 | NA | 36.7 | 98.2 |
| 12 | 3 | 51.2 | 97.5 |
| 13 | 5 | 46.2 | 98.8 |
| 14 | 10 | 42.7 | 98.7 |

From the table it can be seen that a glycol concentration of about 3-5 wt %, when used in combination with camphorsulfonic acid-triethylamine, gave the best results.

Examples 15 and 16

Glycerol/Camphorsulfonic Acid-Triethylamine and Heat Treatment with Various Heat Treatment Times Example 13 was repeated except that different heat treatment times were used. The following results were obtained.

TABLE 5

Effect of heat treatment time on water flux and salt rejection.

| Example Number | Heat Treatment Time (min) | Water Flux (gfd) | Salt Rejection (%) |
|---|---|---|---|
| 1 | NA | 36.7 | 98.2 |
| 13 | 10 | 46.2 | 98.8 |
| 15 | 14 | 52.6 | 98.4 |
| 16 | 18 | 50.7 | 97.9 |

Examples 17 and 18

Glycerol of 3 wt %/Camphorsulfonic Acid-Triethylamine of 6 wt % and Heat Treatment with Various Heat Treatment Times Example 12 was repeated except that different heat treatment times were used. The following results were obtained.

TABLE 6

Effect of heat treatment time on water flux and salt rejection.

| Example Number | Heat Treatment Time (min) | Water Flux (gfd) | Salt Rejection (%) |
|---|---|---|---|
| 1 | NA | 36.7 | 98.2 |
| 12 | 10 | 51.2 | 97.5 |
| 17 | 14 | 50.5 | 98.2 |
| 18 | 18 | 49.1 | 98.1 |

Example 19

Glycerol of 3 wt %/Camphorsulfonic Acid-Triethylamine and Heat Treatment

Example 12 was repeated except that the concentration of camphorsulfonic acid-triethylamine in the aqueous treating solution was varied. The following results were obtained.

TABLE 7

Effect of camphorsulfonic acid-triethylamine concentration on water flux and salt rejection.

| Example Number | Camphorsulfonic Acid-Triethylamine Concentration (wt %) | Water Flux (gfd) | Salt Rejection (%) |
|---|---|---|---|
| 1 | NA | 36.7 | 98.2 |
| 19 | 5 | 48.1 | 97.8 |
| 12 | 6 | 51.2 | 97.5 |

Examples 20-25

Synthesis of Membranes Using Various m-Aminobenzoic Acid-Triethylamine Salt Concentrations in Amine Solutions Example 1 was repeated, except that different amounts of m-aminobenzoic acid-triethylamine (hydrophilic additive) were used in place of o-aminobenzoic acid-triethylamine. The following results were obtained.

TABLE 8

Effect of m-aminobenzoic acid-triethylamine concentration in amine solution on flux and salt rejection.

| Example Number | m-Aminobenzoic Acid-Triethylamine Concentration (wt %) | Water Flux (gfd) | Salt Rejection (%) |
|---|---|---|---|
| Comparative Example A | 0 | 21.6 | 97.7 |
| 20 | 1.9 | 30.7 | 98.4 |
| 21 | 2.375 | 36.3 | 98.4 |
| 22 | 2.6 | 29.3 | 99.3 |
| 23 | 3.3 | 29.2 | 99.1 |
| 24 | 3.8 | 32.7 | 98.7 |
| 25 | 4.3 | 39.1 | 99.2 |

Examples 26-29

Synthesis of Membranes Using Various 2-(2-Hydroxyethyl) Pyridine Concentrations in Amine Solutions Example 1 was repeated, except that different amounts of 2-(2-hydroxyethyl) pyridine (hydrophilic additive) were used in place of o-aminobenzoic acid-triethylamine. The following results were obtained.

TABLE 9

Effect of 2-(2-hydroxyethyl) pyridine concentration in amine solution on flux and salt rejection.

| Example Number | 2-(2-hydroxyethyl) pyridine Concentration (wt %) | Water Flux (gfd) | Salt Rejection (%) |
|---|---|---|---|
| Comparative Example A | 0 | 21.6 | 97.7 |
| 26 | 1.2 | 36.5 | 99.1 |
| 27 | 1.9 | 39.9 | 98.0 |
| 28 | 2.4 | 40.0 | 98.0 |
| 29 | 3.0 | 20.1 | 97.8 |

Example 30-34

Glycerol and Heat Treatment with Various Glycerol Concentrations for Membranes with 2.4 wt % 2-(2-Hydroxyethyl) Pyridine Membranes produced according to Example 28 were soaked in a neutralization solution containing 0.2 wt % sodium carbonate and 3.3 wt % sodium sulfate for 20 seconds, and then rinsed in about 47° C. deionized water 4 times for 4 minutes per rinse. After draining, each membrane was soaked in an aqueous treating solution containing different amounts of glycerol (flux-enhancing additive) and 0.3 wt % sodium lauryl sulfate (surfactant) for 2 minutes. After draining, these membranes were then heat treated at 90° C. for 10 min. The following results were obtained.

TABLE 10

Effect of glycerol concentration on water flux and salt rejection for membranes with 2.4 wt % 2-(2-hydroxyethyl) pyridine.

| Example Number | Glycerol Concentration (wt %) | Water Flux (gfd) | Salt Rejection (%) |
|---|---|---|---|
| 30 | 0 | 40.8 | 97.6 |
| 31 | 1 | 43.1 | 98.2 |
| 32 | 5 | 43.8 | 97.2 |
| 33 | 10 | 43.2 | 97.2 |
| 34 | 20 | 43.3 | 97.6 |

Examples 35-37

Glycerol/Camphorsulfonic Acid-Triethylamine and Heat Treatment with Various Glycerol Concentrations for Membranes with 2.4 wt % 2-(2-Hydroxyethyl) Pyridine Example 32 was repeated except that the membrane was soaked in an aqueous treating solution containing 6 wt % camphorsulfonic acid-triethylamine (flux-enhancing additive), 0.3 wt % sodium lauryl sulfate (surfactant), and different amounts of glycerol (flux enhancing additive) in deionized water for 2 minutes. The following results were obtained.

TABLE 11

Effect of glycerol concentration with camphorsulfonic acid-triethylamine on water flux and salt rejection for membranes with 2.4 wt % 2-(2-hydroxyethyl) pyridine.

| Example Number | Glycerol Concentration (wt %) | Water Flux (gfd) | Salt Rejection (%) |
|---|---|---|---|
| 28 | NA | 40.0 | 98.0 |
| 35 | 1 | 51.2 | 97.5 |
| 36 | 5 | 46.2 | 98.8 |
| 37 | 10 | 42.7 | 98.7 |

Examples 38-41

Glycerol/Camphorsulfonic Acid-Triethylamine and Heat Treatment with Various Heat Treatment Times for Membranes with 2.4 wt % 2-(2-Hydroxyethyl) Pyridine Example 36 was repeated, except that different heat treatment times were used. The following results were obtained.

TABLE 12

Effect of heat treatment time on water flux and salt rejection for membranes with 2.4 wt % 2-(2-hydroxyethyl) pyridine.

| Example Number | Heat Treatment Time (min) | Water Flux (gfd) | Salt Rejection (%) |
|---|---|---|---|
| 28 | NA | 40.0 | 98.0 |
| 38 | 8 | 46.0 | 98.6 |
| 36 | 10 | 46.2 | 98.8 |
| 39 | 12 | 52.5 | 97.8 |
| 40 | 16 | 51.5 | 98.2 |
| 41 | 20 | 46.5 | 98.1 |

Examples 42-47

Synthesis of Membranes Using Various 4-(2-Hydroxyethyl) Morpholine Concentrations in Amine Solutions Example 1 was repeated, except that different amounts of 4-(2-hydroxyethyl) morpholine were used in place of o-aminobenzoic acid-triethylamine. The following results were obtained.

TABLE 13

Effect of 4-(2-hydroxyethyl) morpholine concentration in amine solution on water flux and salt rejection.

| Example Number | 4-(2-hydroxyethyl) morpholine Concentration (wt %) | Water Flux (gfd) | Salt Rejection (%) |
|---|---|---|---|
| Comparative Example A | 0 | 21.6 | 97.7 |
| 42 | 1.2 | 36.5 | 99.1 |
| 43 | 1.5 | 39.8 | 97.6 |
| 44 | 2.3 | 40.7 | 97.6 |
| 45 | 2.5 | 40.9 | 97.6 |
| 46 | 4.0 | 43.6 | 96.6 |
| 47 | 5.0 | 48.7 | 96.1 |

Example 48

Membrane Stability

Figure 1:
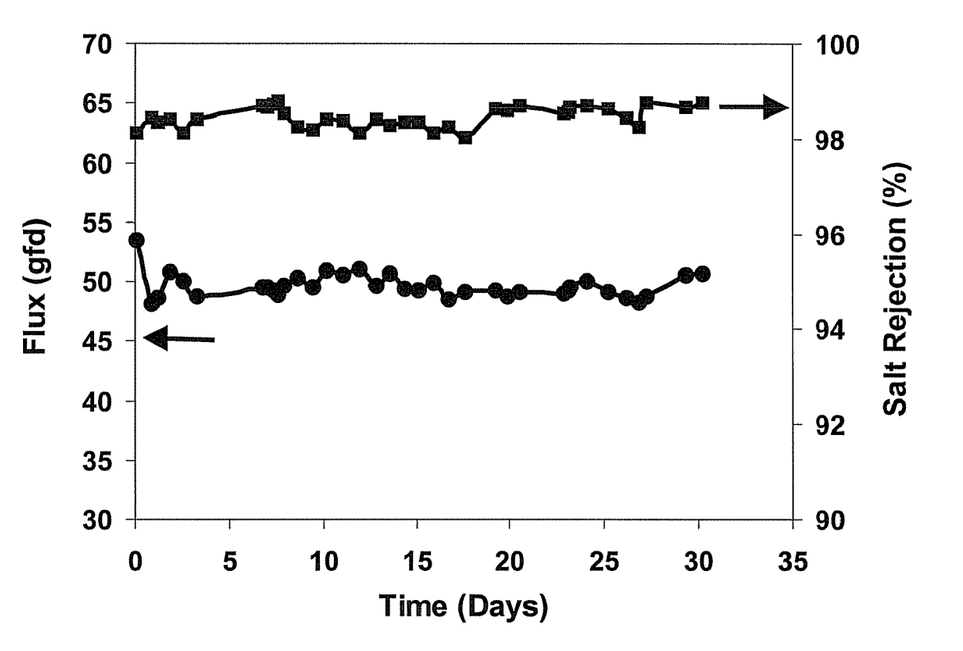
FIG. 1 is a graph illustrating the stability of a reverse osmosis membrane of the present invention in terms of flux and salt rejection versus time.

A membrane prepared according to Example 15 was evaluated for stability in the laboratory reverse osmosis membrane unit under brackish water desalination conditions using the feed solution containing 2000 ppm NaCl in deionized water at 225 psi and 25° C. The water flux and salt rejection results were plotted against time in days in FIG. 1. FIG. 1 shows that the membrane exhibited an excellent stability in terms of stable water flux and salt rejection for the entire test period of about 30 days. The average values were about 50 gfd water flux and 99% salt rejection.

The present invention should not be considered limited to the specific examples described above, but rather should be understood to cover all aspects of the invention. Various modifications, equivalent processes, as well as numerous structures and devices to which the present invention may be applicable will be readily apparent to those of skill in the art.

What is claimed is:

1. A water permeable membrane comprising a membrane formed from a cross-linked aromatic or aromatic/aliphatic polyamide interfacially polymerized on a porous support, wherein the membrane comprises at least one hydrophilic and reactive additive capable of reacting with the cross-linked polyamide selected from 4-(2-hydroxyethyl) morpholine and 2-(2-Hydroxyethyl) pyridine, the salts thereof, and combinations of these;

and wherein the hydrophilic and reactive additive is chemically bonded to the membrane structure during the interfacial polymerization that forms the interfacially polymerized membrane.

2. The membrane of claim 1, wherein the at least one hydrophilic and reactive additive is present in an amount sufficient so that the membrane exhibits a salt rejection capability of at least about 98% when tested with a 2000 ppm NaCl solution at 225 psi and a flux rate of at least about 34 gfd.

3. The membrane of claim 1, wherein the polyamide is formed by reacting an essentially monomeric, aromatic or aromatic/aliphatic amine-reactive polyfunctional acyl halide with an amine solution comprising a monomeric polyamine.

4. The membrane of claim 3, wherein the amine solution further comprises about 0.2 to 20 percent by weight of the hydrophilic and reactive additive.

5. The membrane of claim 3, wherein the amine solution further comprises about 1 to 10 percent by weight of the hydrophilic and reactive additive.

6. The membrane of claim 3, wherein the amine solution further comprises about 2 to 4 percent by weight of the hydrophilic and reactive additive.

7. A water permeable membrane comprising a membrane formed from a cross-linked aromatic or aromatic/aliphatic polyamide interfacially polymerized on a porous support, wherein the membrane further comprises a hydrophilic and reactive additive selected from:

and combinations of these;
wherein:
R is a $C_1$-$C_9$ saturated or unsaturated, substituted or unsubstituted, straight or branched alkyl; and
R' is nothing or a $C_1$-$C_9$ saturated or unsaturated, substituted or unsubstituted, straight or branched alkyl,
and wherein the hydrophilic and reactive additive is chemically bonded to the membrane structure during the interfacial polymerization that forms the interfacially polymerized membrane.

8. The membrane of claim 7, wherein the hydrophilic and reactive additive is selected from o-aminobenzoic acid-triethylamine salt, m-aminobenzoic acid-triethylamine salt, p-aminobenzoic acid-triethylamine salt, o-aminobenzenesulfonic acid-triethylamine salt, m-aminobenzenesulfonic acid-triethylamine salt, p-aminobenezenesulfonic acid-triethylamine salt, o-aminotoluenesulfonic acid-triethylamine salt, m-aminotoluenesulfonic acid-triethylamine salt, p-aminotoluenesulfonic acid-triethylamine salt, o-hydroxybenzoic acid-triethylamine salt, m-hydroxybenzoic acid-triethylamine salt, p-hydroxybenzoic acid-triethylamine salt, and mixtures thereof.

9. The membrane as claimed in claim 7, wherein the membrane further comprises at least one additional hydrophilic and reactive additive selected from:

the salts thereof, and combinations of these;
wherein R is a $C_1$-$C_9$ saturated or unsaturated, substituted or unsubstituted, straight or branched alcohol or a $C_1$-$C_9$ saturated or unsaturated, substituted or unsubstituted, straight or branched amine.

10. The membrane of claim 7, wherein the at least one hydrophilic and reactive additive is present in an amount sufficient so that the membrane exhibits a salt rejection capability of at least about 98% when tested with a 2000 ppm NaCl solution at 225 psi and a flux rate of at least about 34 gfd.

11. A water permeable membrane comprising:
a) a cross-linked polyamide containing one or more pendent reactive groups selected from the group consisting of amines, acyl halides, and mixtures thereof residing on the surface of a porous substrate,
   wherein the cross-linked polyamide is formed by interfacially polymerizing a multifunctional amine with a multifunctional acyl halide to an extent such that sufficient amine functional groups, acyl halide functional groups, or both remain unreacted to thereby comprise the one or more pendent reactive groups; and
b) a hydrophilic and reactive additive selected from:

and combinations of these: wherein:
R is a $C_1$-$C_9$ saturated or unsaturated, substituted or unsubstituted, straight or branched alkyl; and
R' is nothing or a $C_1$-$C_9$ saturated or unsaturated, substituted or unsubstituted, straight or branched alkyl,
wherein the additive is bound to the cross-linked polyamide by chemical attachment of the reactive portion of the additive to the one or more pendent reactive groups and is incorporated into the membrane structure during the interfacial polymerization that forms the interfacially polymerized membrane; and wherein the membrane exhibits improved water flux and improved salt retention properties compared to an otherwise identical membrane that does not contain any additive.

12. The water permeable membrane of claim 11, wherein the additive is present in an amount sufficient so that the membrane exhibits a salt rejection capability of at least about 98% when tested with a 2000 ppm NaCl solution at 225 psi and a flux rate of at least about 34 gfd.

13. A method for forming a water permeable membrane, comprising:
applying a solution of at least one aromatic or aromatic/aliphatic polyamine to a porous support; and
applying a polyfunctional acyl halide solution to a porous support including pore surfaces such that a water permeable membrane is formed on the porous support comprising cross-linked aromatic or aromatic/aliphatic polyamide that is interfacially polymerized on the pore surfaces, wherein at least one hydrophilic and reactive additive selected from 4-(2-hydroxyethyl) morpholine and 2-(2-Hydroxyethyl) pyridine, the salts thereof, and combinations of these, that chemically bonds to the membrane structure during the interfacial polymerization. is present in at least one of the solution of aromatic or aromatic/aliphatic polyamine and the polyfunctional acyl halide solution.

14. The method of claim 13 further comprising soaking the water permeable membrane so formed in a flux enhancing solution.

15. The method of claim 13 wherein the presence of the at least one hydrophilic and reactive additive improves the flux and salt retention properties of the membrane in comparison to a membrane formed without the at least one hydrophilic and reactive additive.

16. A method for forming a water permeable membrane, comprising:
applying a solution of at least one aromatic or aromatic/aliphatic polyamine to a porous support including pore surfaces; and
applying a polyfunctional acyl halide solution to a porous support such that a water permeable membrane is formed on the porous support comprising cross-linked aromatic or aromatic/aliphatic polyamide that is interfacially polymerized on the pore surfaces, wherein at least one hydrophilic and reactive additive is present in at least one of the solution of aromatic or aromatic/aliphatic polyamine and the polyfunctional acyl halide solution that chemically bonds to the membrane structure during the interfacial polymerization, and wherein the at least one hydrophilic and reactive additive is selected from:

-continued and combinations,
wherein:
R is a $C_1$-$C_9$ saturated or unsaturated, substituted or unsubstituted, straight or branched alkyl; and
R' is nothing or a $C_1$-$C_9$ saturated or unsaturated, substituted or unsubstituted, straight or branched alkyl.

17. The method of claim 16 further comprising soaking the water permeable membrane so formed in a flux enhancing solution.

18. The method of claim 16 wherein the presence of the at least one hydrophilic and reactive additive improves the flux and salt retention properties of the membrane in comparison to a membrane formed without the at least one hydrophilic and reactive additive.

19. A method for desalinating water comprising passing the water under pressure through a membrane according to claim 1.

20. A method for desalinating water comprising passing the water under pressure through a membrane according to claim 7.

21. A method for performing dialysis comprising contacting a membrane according to claim 1 with a solution containing solutes and allowing water to diffuse through the membrane.

22. A method for performing dialysis comprising contacting a membrane according to claim 7 with a solution containing solutes and allowing water to diffuse through the membrane.

23. A method for performing pervaporation comprising contacting a membrane according to claim 1 with a feed solution under pressure and allowing pervaporation to occur.

24. A method for performing pervaporation comprising contacting a membrane according to claim 1 with a liquid feed solution containing solutes and allowing pervaporation to occur.

25. A method for performing pervaporation comprising contacting a membrane according to claim 7 with a liquid feed solution containing solutes and allowing pervaporation to occur.

* * * * *